United States Patent Office 3,553,219
Patented Jan. 5, 1971

---

3,553,219
MANUFACTURE OF PYRIDINE AND SUBSTITUTED PYRIDINES
John Anthony Corran, Runcorn, England, assignor to Imperial Chemical Industries Limited, London, England, a corporation of Great Britain
No Drawing. Filed Aug. 24, 1967, Ser. No. 662,897
Claims priority, application Great Britain, Sept. 5, 1966, 39,582/66
Int. Cl. C07d *31/14*
U.S. Cl. 260—290                                5 Claims

ABSTRACT OF THE DISCLOSURE

Manufacture of pyridines by interaction of piperidine or a tetrahydropyridine with molecular oxygen in the vapour phase at an elevated temperature.

---

This invention relates to the manufacture of pyridine or substituted pyridines and in partciular to a process for the dehydrogenation of piperidine, a tetrahydropyridine or susbtituted derivatives of the said compounds.

According to the present invention there is provided a process for the manufacture of pyridine or a substituted pyridine which comprises interacting piperadine, a tetrahydropyridine or a substituted derivative of one of the said starting materials with molecular oxygen in the vapour phase at an elevated temperature.

The process is applicable, in particular, to the production of pyridine itself from piperidine or a tetrahypridine but it will be apparent that a wide range of substituted piperidines or tetrahydropyridines may be used as starting materials.

The proportion of oxygen in the reaction mixture may vary over a wide range but it is preferred to use at least 0.5 mole of oxygen per mole of hydrogen to be removed from the starting material. Thus when tetrahydropyridine is the starting material it is preferred to use at least 1 mole of oxygen per mole of tetrahydropyridine; when piperidine is the starting material it is preferred to use at least 1.5 moles of oxygen per mole of piperidine.

The reaction mixture may be diluted, for example with nitrogen, steam of mixtures thereof; the composition of the reaction mixture may be adjusted to avoid inflammability or explosive properties.

The reaction mixture may also contain ammonia.

The reaction may be carried out as a homogeneous gas phase reaction but is preferably carried out in the presence of a catalyst. Suitable catalysts include, for example, those comprising silica, alumina or a silica-alumina, with or without one or more metals, oxides or salts as impregnants.

The reaction may be carried out over a wide range of temperatures, preferably in the range from 200° C. to 600° C. The residence time within the reactor may also vary over a wide range; in general the reaction may conveniently be carried out using flow-rates equivalent to residence times in the range from 0.1 to 60 seconds (calculated from the flow-rate at N.T.P.). When a catalyst is present this may be used either in a fixed bed or in a fluidised bed.

The reaction is conveniently carried out at substantially atmospheric pressure but higher or lower pressures may be employed.

The pyridine or substituted pyridine may be isolated by known techniques, for example solvent extraction or distillation. Unreacted starting material may be re-cycled if desired.

The invention is illustrated, but not limited by the following examples.

EXAMPLE 1

A mixture of piperidine and water (containing 32% by weight piperidine) was vapourised and passed, together with a stream of air, through an empty 1 inch bore glass reaction tube maintained at 300° C. over 20 inches of its length.

The flow was continued for a period of 2 hours, during which time a total of 24 grams of piperidine and 56 litres of air were fed.

4 mole percent of the piperidine fed was converted into pyridine.

EXAMPLE 2

The procedure of Example 1 was repeated except that the reaction tube contained 133 grams of a silica-alumina catalyst in the form of ⅛ inch pellets. The catalyst contained 13% by weight of alumina; the surface area was 208 m.²/gram. The catalyst was maintained at 300° C. and flow was continued for 2 hours.

33 mole percent of the piperidine fed was converted into pyridine.

EXAMPLE 3

A mixture of 1,2,3,6-tetrahydropyridine and water (containing 32% by weight of tetrahydropyridine) was vapourised and passed, together with a stream of air through a glass tube containing 133 grams of the silica-alumina catalyst described in Example 2.

The catalyst was maintained at 300° C. and the flow was continued for a period of 20 minutes, during which time a total of 5 grams of tetrahydropyridine and 6 litres of air were fed.

30 mole percent of the tetrahydropyridine fed was converted into pyridine.

EXAMPLE 4

A mixture of piperidine and water (containing 32% by weight of piperidine) was vapourised and passed, together with air, through a ¾ inch bore glass reaction tube containing 30 grams of a silica-alumina catalyst in the form of ⅛ inch pellets. The catalyst contained 13% by weight of alumina; the surface area was 390 m.²/gram. The catalyst was maintained at 310° C. and flow was continued for 1 hour, during which time a total of 9.8 grams of piperidine and 30 litres of air were fed.

64 mole percent of the piperidine fed was converted into pyridine.

What we claim is:

1. A process for the manufacture of pyridine which comprises interacting piperidine or a tetrahydropyridine in the absence of a catalyst or in the presence of a catalytic material selected from the group consisting of silica, alumina and silica-alumina with molecular oxygen in the vapour phase at an elevated temperature of from 200° to 600° C. wherein the proportion of oxygen in the reaction mixture is at least 0.5 mole per mole of hydrogen to be removed from the starting material.

2. A process as claimed in claim 1 wherein the starting material is a tetrahydropyridine and the proportion of oxygen in the reaction mixture is at least 1 mole per mole of tetrahydropyridine.

3. A process as claimed in claim 1 wherein the starting material is piperidine and the proportion of oxygen in the reaction mixture is at least 1.5 moles per mole of piperidine.

4. A process as claimed in claim 1 wherein the reaction mixture contains a gaseous diluent.

5. A process as claimed in claim 5 wherein the gaseous diluent is nitrogen, steam or a mixture thereof.

References Cited

UNITED STATES PATENTS 2,765,311  10/1956  Horrobin et al. _____ 260—290

NORMA S. MILESTONE, Primary Examiner

H. I. MOATZ, Assistant Examiner